United States Patent
Sugiyama (10) Patent No.: US 8,756,545 B2
(45) Date of Patent: Jun. 17, 2014

(54) DELAY TIME CALCULATING APPARATUS AND METHOD

(75) Inventor: Hiroyuki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 13/539,590

(22) Filed: Jul. 2, 2012

(65) Prior Publication Data

US 2013/0047131 A1 Feb. 21, 2013

(30) Foreign Application Priority Data

Aug. 17, 2011 (JP) .................................. 2011-178624

(51) Int. Cl.
*G06F 17/50* (2006.01)

(52) U.S. Cl.
USPC ........... 716/108; 716/110; 716/111; 716/113; 716/134

(58) Field of Classification Search
CPC ............ G06F 17/5031; G06F 17/5045; G06F 17/5059; G06F 2217/84
USPC .................... 716/108–114, 132–134
See application file for complete search history.

(56) References Cited

U.S. PATENT DOCUMENTS

| 5,638,294 | A | 6/1997 | Sasada |
| 6,286,126 | B1 * | 9/2001 | Raghavan et al. ............ 716/113 |
| 2003/0217344 | A1 * | 11/2003 | Ito et al. ............................ 716/6 |

FOREIGN PATENT DOCUMENTS

| JP | 03-220676 | 9/1991 |
| JP | 06-060145 | 3/1994 |
| JP | 07-182380 | 7/1995 |

OTHER PUBLICATIONS

Odabasioglu et al., "PRIMA: Passive Reduced-order Interconnect Macromodeling Algorithm", IEEE (1997), pp. 58-65.

* cited by examiner

*Primary Examiner* — Paul Dinh
(74) *Attorney, Agent, or Firm* — Fujitsu Patent Center (57) ABSTRACT

An apparatus calculates a delay time of nets within a circuit included in design data by a processing unit. The processing unit performs a process that includes selecting a first calculation to calculate the delay time of a net when the net satisfies a first condition, when the first calculation is not selected by the selecting, selecting the first or second calculation to calculate the delay time of the net, depending on whether the net satisfies a second condition, and calculating the delay time of the net by the first or second calculation selected by the selecting.

21 Claims, 6 Drawing Sheets

LIMIT VALUE TABLE 31

| NODE NUMBER (Nx) |
|---|
| FAN-OUT NUMBER (FOx) |
| WIRING LENGTH (Lx) |
| TOTAL CAPACITANCE (Cx) |
| TOTAL RESISTANCE (Rx) |
| LIMIT TIME (Tx) |

FIG.3

DESIGNATED DRIVER TABLE 32

| DRIVER NAME |
|---|
| : |

DELAY TIME CALCULATING APPARATUS AND METHOD

CROSS-REFERENCE TO RELATED APPLICATIONS

This application is based upon and claims the benefit of priority of the prior Japanese Patent Application No. 2011-178624, filed on Aug. 17, 2011, the entire contents of which are incorporated herein by reference.

FIELD

The embodiments discussed herein are related to a delay time calculating apparatus and a delay time calculating method to calculate a delay time in a LSI (Large Scale Integrated circuit) and the like. The embodiments discussed herein are also related to a non-transitory computer-readable storage medium having stored therein a program for causing a computer to execute a process for calculating the delay time.

BACKGROUND

When designing the LSI using CAD (Computer Aided Design), internal delay times of the LSI used for timing analysis or the like may be categorized into a gate delay and a net delay. The gate delay refers to a delay time of a signal propagating through a gate, that is, a circuit element. On the other hand, the net delay refers to a delay time of a signal propagating through a wiring. Generally, the gate delay may be calculated using a library that is characterized by an input waveform distortion (or slew) and an output load capacitance. On the other hand, the net delay may be calculated according to various kinds of calculating methods.

A first calculating method restrictively calculates the delay time in a narrow range by instructing a high-precision calculation for each case in which the high accurate calculation is preferable. A second calculating method calculates the delay time by a single calculating method depending on a tradeoff between the accuracy of the delay time and the calculation cost, when performing the calculation with respect to all nets of the LSI. The calculation cost refers to a cost that takes into consideration a processing time (or calculation time), a memory capacity preferred by the process (or calculation), and the like.

On the other hand, a third calculating method extracts a C (capacitance) model and a RC (resistance-capacitance) model when extracting a stray capacitance, and calculates the delay time by using a calculation formula that is suited for each model depending on a wiring length. However, the accuracy of the third calculating method may be insufficient with respect to the most recent microtechnology. In addition, the third calculating method does not calculate the delay time by taking into consideration an inductance. Furthermore, the calculation of the delay time using the C model and the RC model may generate a relatively large calculation error. For example, when one of the C model and the RC model is selected depending solely on the wiring length, a different model may be selected depending on a difference of 0.01 μm between the wiring lengths of the models, for example. As a result, even though the two nets are essentially the same in appearance, the delay time that is calculated by the calculation formula may greatly differ depending on the model that is selected.

A fourth calculating method categorizes the nets of the entire LSI into normal nets and bus nets, for example, and the delay time for the bus nets is calculated using a calculation formula suited for the bus nets.

A fifth calculating method uses an Elmore delay model, in order to simply obtain the delay time from the wiring resistance and the wiring capacitance by approximation. A sixth calculating method uses an AWE (Asymtotic Waveform Evaluation) in order to obtain a response waveform with respect to an input step voltage by approximation. According to the sixth calculating method, the calculation accuracy becomes higher as the order of the solution becomes higher, however, the calculation cost greatly increases as the order of the solution becomes higher.

A seventh calculating method uses a PRIMA (Passive Reduced-order Interconnect Macromodeling Algorithm) that solves a determinant representing a circuit formula (or equation) by reducing elements of the determinant. However, according to the seventh calculating method, the calculation accuracy becomes higher as the order of the solution becomes higher, however, the calculation cost greatly increases as the order of the solution becomes higher.

Recently, the microtechnology of the high-speed LSI may prefer the calculation accuracy of the net delay time to be further improved. In addition, the number of nets in the entire LSI is extremely large due to the increase in the design scale. In the recent LSI having the increased design scale, the number of gates or the number of wiring nets may exceed 10,000,000. For this reason, when the high-precision calculating method is used with respect to all of the nets of the LSI, the calculation time to calculate the delay time becomes extremely long an impractical.

Hence, although there are various proposed methods to calculate the delay time of the net within the LSI, the calculation cost increases when the delay time is to be calculated with a high accuracy. Accordingly, it is difficult to calculate the delay time of the net in the circuit with a high accuracy.

Examples of the related art include Japanese Laid-Open Patent Publications No. 7-182380, No. 6-60145, and No. 3-220676, and A. Odabasioglu, M. Celik, and T. Pileggi, "PRIMA: passive reduced-order interconnect macromodeling algorithm", ICCAD 1997, pp. 58-65.

SUMMARY

Accordingly, it is an object in one aspect of the embodiment to provide a delay time calculating apparatus, a delay time calculating method, and a computer-readable storage medium, that may calculate a delay time of a net of a circuit with a high accuracy.

According to one aspect of the present invention, a delay time calculating apparatus for calculating a delay time of nets within a circuit included in design data, may include a processing unit configured to perform a process including first selecting a first delay calculating procedure to calculate the delay time of a net when the net satisfies a first condition; when the first delay calculating procedure is not selected by the first selecting, second selecting one of the first delay calculating procedure and a second delay calculating procedure to calculate the delay time of the net, depending on whether the net satisfies a second condition; and calculating the delay time of the net by one of the first and second delay calculating procedures selected by one of the first and second selecting.

The object and advantages of the invention will be realized and attained by means of the elements and combinations particularly pointed out in the claims.

DESCRIPTION OF EMBODIMENTS

Preferred embodiments of the present invention will be described with reference to the accompanying drawings.

It may be conceivable to calculate a delay time of a net within a LSI with a high accuracy only when a judging condition is satisfied, for example. However, depending on the judging condition, the high-precision calculation is not be performed even though the high-precision calculation is preferable. On the other hand, depending on the judging condition, the high-precision calculation having the high calculation cost may be performed when not preferred. In other words, the calculation cost may be suppressed when the judging condition to be satisfied is set strict, however, a simple calculation with a relatively low accuracy may be performed even though the high-precision calculation is preferable, and in this case, the highly accurate delay time is not obtained. On the other hand, the delay time may be calculated with the high accuracy when the judgement condition to be satisfied is set lenient (or not strict), however, the high-precision calculation may be performed even though the simple calculation with the relatively low accuracy is preferable, and in this case, the calculation cost greatly increases. Therefore, calculating the delay time of the net within the LSI with the high accuracy, and suppressing the calculation cost of calculating the delay time are in a tradeoff relationship, and it may be difficult to simultaneously perform the high-precision calculation and suppress the calculation cost.

One aspect of the embodiment uses the fact that, depending on a type of the net within the circuit included in design data, a delay time calculated by a simple calculation may have an accuracy sufficiently comparable to that of the delay time calculated by a detailed calculation, and an error between the delay times calculated by the simple calculation and the detailed calculation may be extremely small for the net having a short wiring length, for example. Hence, the nets within the circuit included in the design data may be categorized by a plurality of judging conditions, and the calculating method may be determined depending on the type of the net, in order to accurately calculate the delay time of the net with respect to the entire circuit. The calculating method may be determined in order not to greatly increase the calculation cost.

When categorizing the nets by the plurality of judging conditions, if the calculating method may be determined by first performing the judgement that may be made in a relatively short judging time, the judgement that may take a relatively long judging time may be omitted, in order to reduce the time to determine the calculating method from the start of the judgement and to speed up the process of completing the calculation of the delay time.

In addition, the larger the number of nodes, that is physical information of the net defined in a virtual manner from the circuit included in the design data, the more complex the wiring is, and there is a tendency for the wiring length or the wiring load to increase. Hence, the calculating method may be determined from the net having the large number of nodes. In addition, by providing a setting time, the calculation of the delay time may be switched from the high-precision calculation to the simple calculation when preferred, so that the delay time calculating process with respect to all of the nets within the circuit is completed within a desired time. In these cases, the delay time of the net preferring a predetermined calculation accuracy may be calculated within a limited time with a priority over the delay time of other nets.

A description will now be given of the delay time calculating apparatus, the delay time calculating method, and the computer-readable storage medium in each embodiment according to the present invention.

Figure 1:
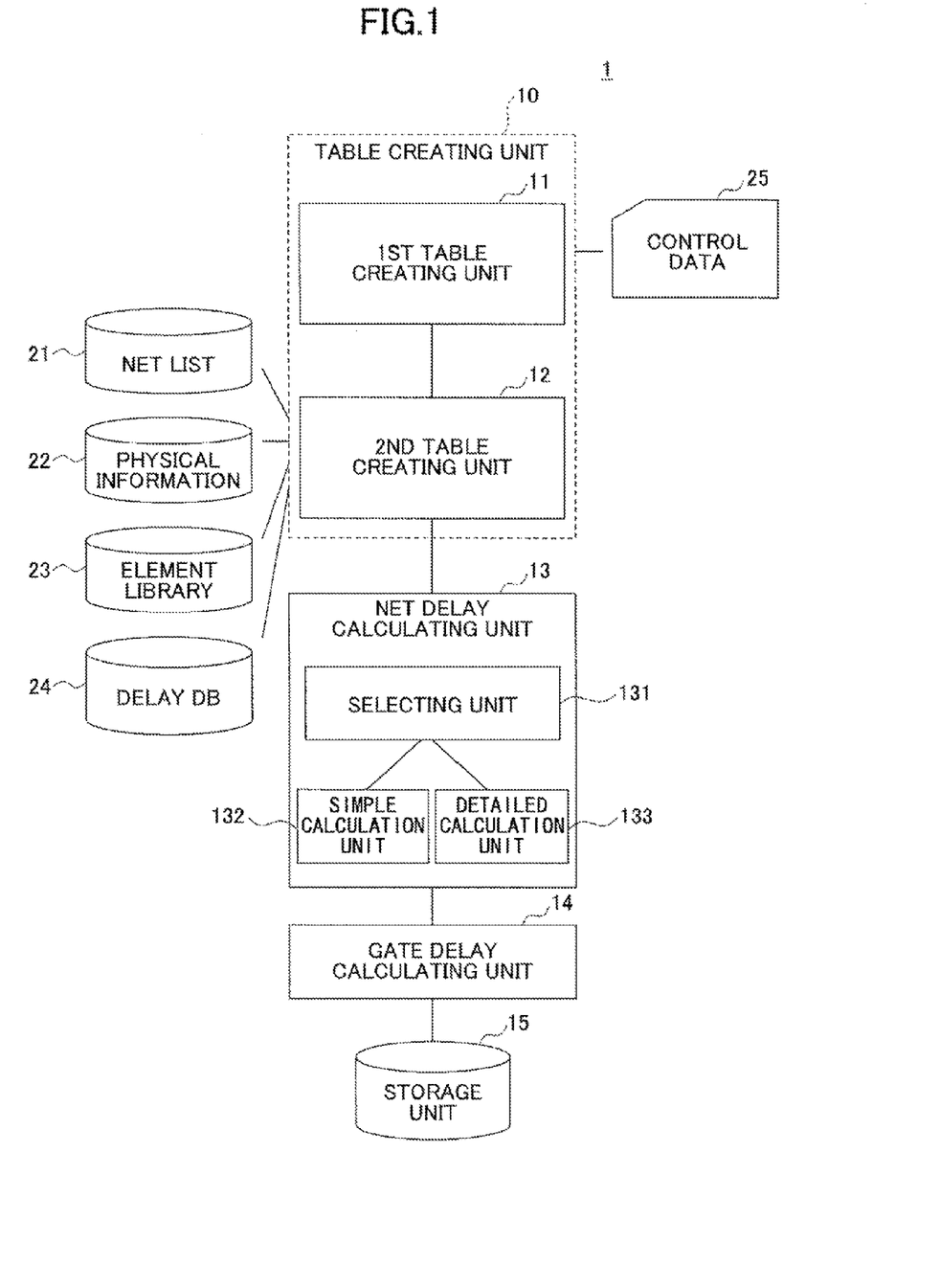
FIG. 1 is a functional block diagram illustrating an example of a delay time calculating apparatus in an embodiment.

FIG. 1 is a functional block diagram illustrating an example of the delay time calculating apparatus in an embodiment. A delay time calculating apparatus 1 illustrated in FIG. 1 includes a table creating unit 10, a net delay calculating unit 13, a gate delay calculating unit 14, and a storage unit 15. The table creating unit 10 includes a first table creating unit 11 and a second table creating unit 12. The net delay calculating unit 13 includes a selecting unit 131, a simple calculation unit 132, and a detailed calculation unit (or high-precision calculation unit) 133.

Figure 2:
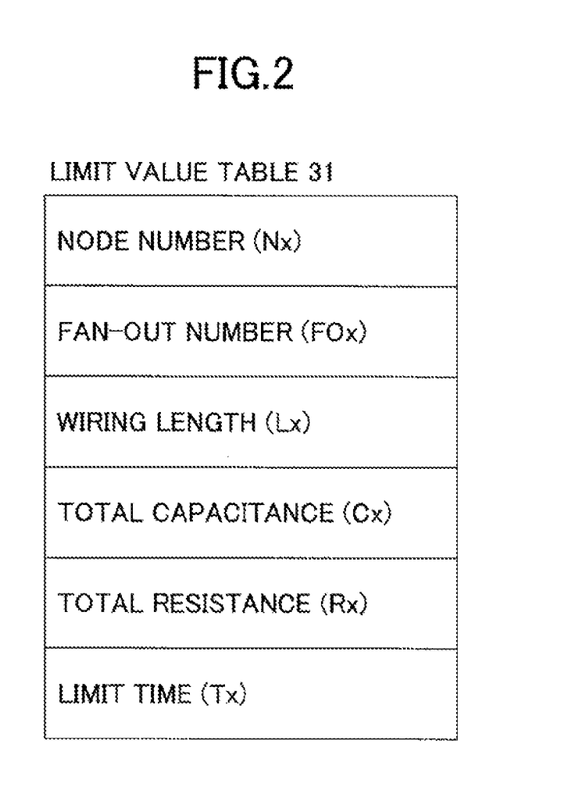
FIG. 2 is a diagram for explaining an example of a limit value table.
Figure 3:
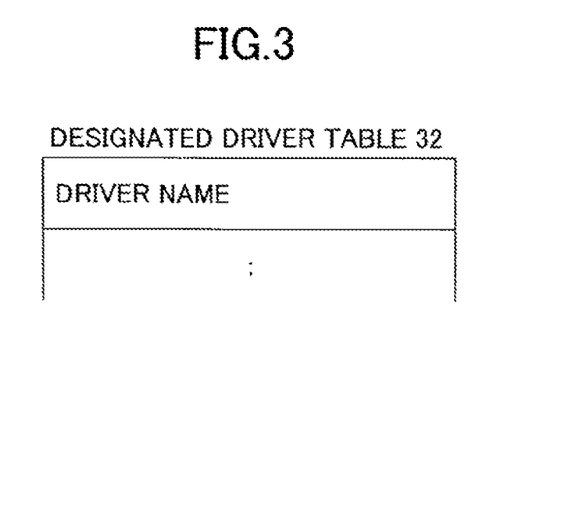
FIG. 3 is a diagram for explaining an example of a designated driver table.

The first table creating unit 11 creates a limit value table 31 illustrated in FIG. 2 and a designated driver table 32 illustrated in FIG. 3, based on input data from control data 25 that include limit values of various parameters. In other words, the control data 25 include information to create the limit value table 31 and the designated driver table 32, and include information related to designation conditions determined from input designations made by a user. The input data (including the information related to the designation conditions determined from the input designations made by the user) from the control data 25 may be input from an input device (not illustrated) such as a keyboard or the like, or may be input after being read from an external storage unit or an internal storage unit including the storage unit 15.

FIG. 2 is a diagram for explaining an example of the limit value table 31. The limit value table 31 stores parameters such as a node number (or number of nodes) Nx, a fan-out number (or number of fan-outs) FOx, a wiring length Lx, a total capacitance Cx, a total resistance Rx, a limit time Tx, and the like that are designated with respect to a target net (or calculation target) for which a delay time is to be calculated, when the conditions for performing the detailed calculation (or high-precision calculation) is designated as will be described later. A node refers to a connection point that connects wirings, or a connection point that connects a wiring and a gate, and includes an input and/or output pin, vias, and the like of the gate (or circuit block). The node may also include a virtual connection point that connects the wirings. In other words, the node may be defined in a virtual manner from a circuit (or circuit information) included in design data. Default values may be stored with respect to the parameters for which the conditions for performing a detailed calculation are not designated. The limit time Tx may be used to judge whether the calculation of the delay time of all of the nets of the circuit included in the design data is completed within a reference time, and a detailed description of thereof, including the detailed calculation, will be given later in the specification. When the limit time Tx elapses from a start of the calculation of the delay time of all of the nets of the circuit included in the design data before the calculation is completed, the simple calculation may thereafter be performed with respect to the remaining nets of the circuit included in the design data. A detailed description of the simple calculation will be given later in the specification.

FIG. 3 is a diagram for explaining an example of the designated driver table 32. The designated driver table 32 stores driver names that are designated with respect to each target net. The net having the driver designated by the driver name stored in the designated driver table 32 becomes the target net that is the calculation target of the detailed calculation.

Figure 4:
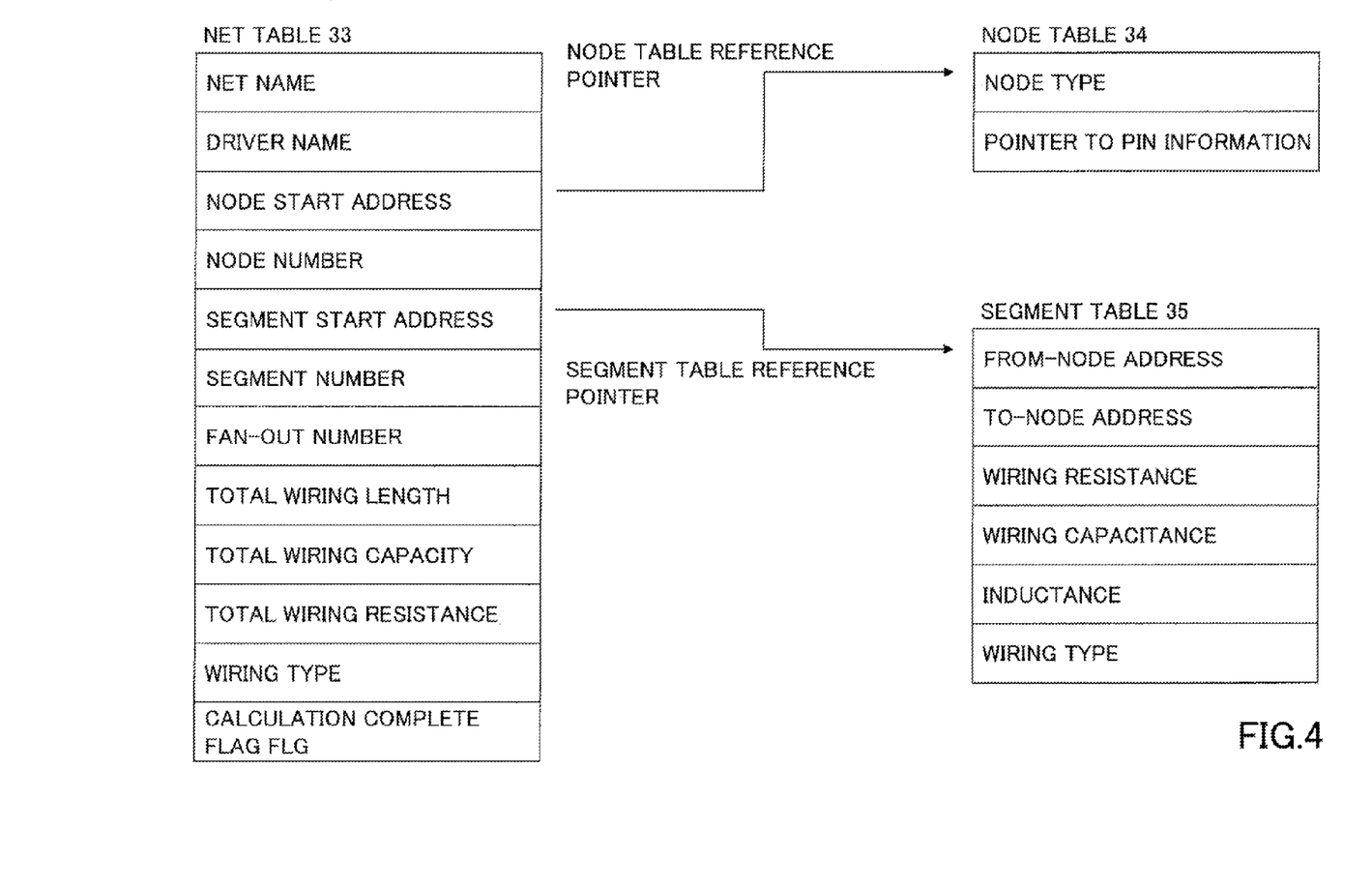
FIG. 4 is a diagram for explaining examples of a net table, a node table, and a segment table.

The second table creating unit 12 creates a net table 33, a node table 34, and a segment table 35 illustrated in FIG. 4, based on a net list 21 including logic information related to a design target (or analyzing target) such as the LSI, physical information 22 of the design target including segments (wirings), an element library 23 including various parameters of elements, and a delay database (DB) 24 that stores delay times (net delays) calculated for the nets. The second table creating unit 12 creates the tables 33, 34, and 35 by obtaining for each net the nodes forming the net, and the information of the segment connecting the nodes, from the physical information 22. Input data from the net list, 21, the physical information 22, the element library 23, and the delay DB 24 may be input from an input device (not illustrated) such as a keyboard or the like, or may be input after being read from an external storage unit or an internal storage unit including the storage unit 15. In this example, it is assumed for the sake of convenience that at least the delay DB 24 is stored in the storage unit 15.

FIG. 4 is a diagram for explaining examples of the net table 33, the node table 34, and the segment table 35. The net table 33 is created after the second table creating unit 12 reads the net list 21. The net table 33 stores, with respect to all of the nets within the LSI, parameters such as a net name, a driver name, a node start address, a node number (or number of nodes), a segment start address, a segment number (or number of segments), a fan-out number (or number of fan-outs), a total wiring length, a total wiring capacitance, a total wiring resistance, a wiring type, a calculation complete flag FLG, and the like.

A value which will be described later is set in the calculation complete flag FLG that is stored with respect to one net, depending on the calculating method used for this one net, and stored in the delay DB 24 together with the calculated delay time. In addition, when using, as the input, the data in the delay DB 24 obtained by the calculation of the delay time performed in the past, the value of the calculation complete flag FLG that is set in the data read from the delay DB 24 is set in the calculation complete flag FLG. For example, when the calculation complete flag FLG is FLG=0, it is indicated that the calculation of the delay time has not been performed with respect to the net. When newly performing the calculation from the net list 21, or when performing the calculation of the delay time from the beginning due to a change in design information and the like, the calculation complete flag FLG is set to FLG=0. When the calculation complete flag FLG is FLG=1, it is indicated that the net is calculated by the simple calculation. When the calculation complete flag FLG is FLG=2, it is indicated that the net is calculated by the detailed calculation. When the calculation complete flag FLG is FLG=3, it is indicated that the previous calculation of the net has been switched to the simple calculation due to exceeding the time limit.

The node table 23 stores, with respect to each node, parameters such as a node type, a pointer to pin information, and the like. For example, the node type has a value "1" when the node is a pin, has a value "2" when the node is a via, and otherwise has a value "0". The node start address stored in the net table 33 forms a reference point to the node of the node table 34, as indicated by an arrow in FIG. 4.

The segment table 35 stores, with respect to each segment, parameters such as a from-node address from the node table 34, a to-node address to the node table 34, a wiring resistance, a wiring capacitance, an inductance, a wiring type, and the like. For example, the wiring type has a value "1" in the case of a real wiring, and a value 0" in the case of a virtual wiring. The segment start address stored in the net table 33 forms a reference pointer to the segment of the segment table 35, as indicated by an arrow in FIG. 4.

The first table creating unit 11 creates the limit value table 31 and the designated driver table 32 when the delay time calculating process is started and the control data 25 are input. When the limit value table 31 and the designated driver table 32 are created, the second table creating unit 12 may create the net table 33, the node table 34, and the segment table 35 with respect to all of the nets of the circuit, or may create the net table 33, the node table 34, and the segment table 35 only with respect to the target net at a time when preferred for the delay time calculating process for the target net. In the latter case, the second table creating unit 12 may store the parameters such as the fan-out number, the total wiring length, the total wiring capacitance, the total wiring resistance, the wiring type, the calculation complete flag FLG, and the like in the tables 33 through 35, in a manner obtainable (or retrievable) by the net delay calculating unit 13, at a time when preferred for each judgement to be performed using the judging conditions that will be described later in conjunction with FIG. 5.

Elements that determine the calculation cost to calculate the net delay, that is, the delay time of the net, with respect to the entire circuit such as the LSI, may be categorized into the following three conditions J1 through J3. A designating condition (or requirement) J1 may be determined from the input designation from the user. The logical condition J2 may be determined from logical information of the circuit. The physical condition J3 may be determined from physical information of the circuit.

The selecting unit 131 of the net delay calculating unit 13 may select the calculating method to be used for the delay time of the net, as will be described later, depending on the conditions J1, J2, and J3, using the tables 31 through 35 described above. When the selecting unit 131 selects the simple calculating method (or simple delay calculating procedure), the simple calculation unit 132 calculates the delay time of the net using the simple calculating method and stores the calculated delay time in the storage unit 15. On the other hand, when the selecting unit 131 selects the detailed calculating method (or detailed delay calculating procedure), the detailed calculation unit 133 calculates the delay time of the net using the detailed calculating method and stores the calculated delay time in the storage unit 15. The gate delay calculating unit 14 calculates the gate delay by a know method of calculating the delay time, using a library that is characterized by the input waveform distortion (or slew) and the output load capacitance, and stores the calculated gate delay in the storage unit 15. The calculation of the gate delay is not directly related to the operation of this embodiment, and thus, a detailed description thereof will be omitted. In addition, in the case of a design process (or analyzing process) that does not use the gate delay, the gate delay calculating unit 14 may be omitted.

When determining whether to use the simple calculating method or the detailed calculating method for the calculation of the delay time at an early stage of the delay time calculating process, the time to make the judgement in order to determine the calculating method may be reduced, and this time reduction may contribute to reducing the time to complete the calculation of the delay time of the net with respect to the entire circuit. In addition, due to differences in amounts of information used to judge the three conditions J1 through J3 described above, the time to obtain the information used for the judgement is longest for the condition J3, second longest for the condition J2, and third longest (or shortest) for the condition J1. Accordingly, when the conditions J1, J2, and J3 are judged in this order in which the time to obtain the information used for the judgement is shortest for the condition J1, second shortest for the condition J2, and third shortest (or longest) for the condition J3, and the selection of the calculating method is completed at the early stage, the time to complete the calculation of the delay time for the net with respect to the entire circuit may be reduced. The time to complete the calculation of the delay time for the net with respect to the entire circuit may be reduced, because the judgement is performed in the order in which the time to make the judgement is the shortest, including the time to obtain the information used to judge the condition. Moreover, when the information to judge one of the conditions J1, J2, and J3 is obtained at a time when the information is preferred, the time to complete the calculation of the delay time for the net with respect to the entire circuit may be reduced compared to the case in which the tables 33 through 35 are created in advance by the second table creating unit 12 for all of the nets of the circuit. Similarly, when the information used to calculate the wiring delay in the simple calculation or the like that is performed as a result of judging the condition, at a time when the information is preferred, the time to complete the calculation of the delay time for the net with respect to the entire circuit may be reduced. The number of nets within the circuit may exceed 10,000,000, for example. Hence, by reducing the processing time (or calculation time) in the process with respect to one target net as described above, the effect of reducing the time to complete the calculation of the delay time for all of the nets within the circuit may be large.

The following items k1 through k9 may be obtained by categorizing the conditions J1 through J3 described above into more detailed items.

k1: Whether the wiring is a real wiring or a logical wiring (virtual wiring or the like depending on a gate position);
k2: Total resistance;
k3: Total capacitance;
k4: Fan-out number;
k5: Wiring length;
k6: Node number and segment number as wiring information;
k7: Driver type;
k8: Whether to take inductance into consideration; and
k9: Calculation time.

The calculating method suited for each target net may be judged using the items k1 through k9 as keys (or indexes), and the calculation may be performed using the calculating method that is judged as being suited for the target net. When storing the calculated delay time (net delay) in the delay DB 24 within the storage unit 15, the calculation complete flag FLG that identifies the calculating method used to calculate the net delay may be set and stored in the delay DB 24 together with the net delay. A reference to the calculation complete flag FLG may be made when recalculating the net delay, such as when a more accurate calculation is preferred.

The delay DB 24 may be used when calculating a path delay of a path, such as a path between flip-flops, and the like. In the design process (or analyzing process) of the LSI, the delay time may be displayed together with a route of the path. By additionally displaying, on a display unit, the calculation method used to calculate the delay time together the net, the detailed calculation may be performed by designating the net when the user wishes to increase the calculation accuracy, for example.

Figure 5:
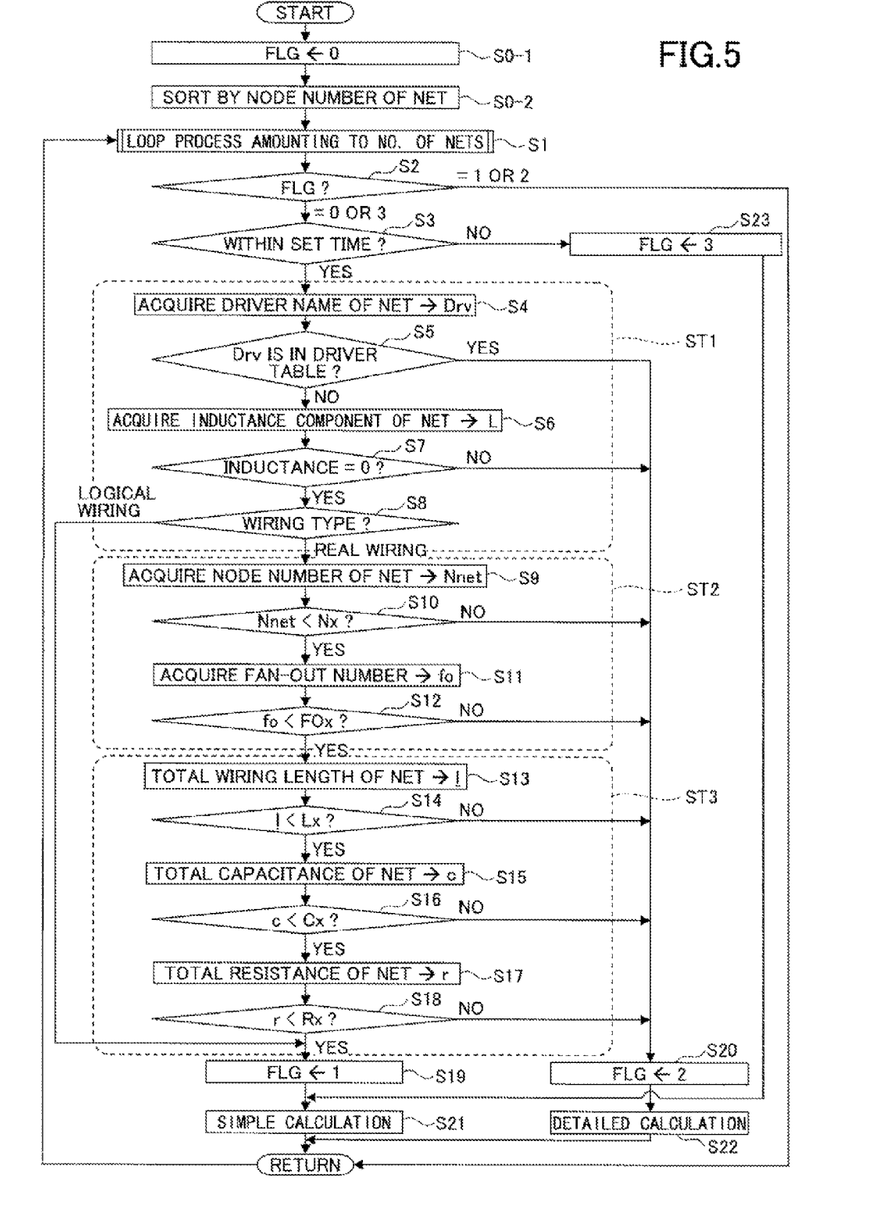
FIG. 5 is a flow chart for explaining an example of a delay time calculating process.

FIG. 5 is a flow chart for explaining an example of the delay time calculating process using the conditions J1 through J3 described above. The delay time calculating process illustrated in FIG. 5 may be performed by the net delay calculating unit 13 illustrated in FIG. 1. In FIG. 5, a process ST1 is related to the designating condition J1 determined from the input designation, a process ST2 is related to the logical condition J2, and a process ST3 is related to the physical condition J3. Steps S5, S7, and S8 perform a comparing process (or selecting process) using the designating condition J1, steps S10 and S12 perform a comparing process using the logical condition J2, and steps S14, S16, and S18 perform a comparing process using the physical condition J3, in this order. The order of the comparing processes is determined in order to determine at an early stage whether to use the simple calculation or the detailed calculation, and contributes to a high-speed processing of the comparing process (or judging process). When no designating condition J2 exists, the delay time calculating process may be performed by executing the processes ST2 and ST3 using the conditions J2 and J3.

In the delay time calculating process illustrated in FIG. 5, the process of switching between the simple calculation and the detailed calculation when preferred, may be repeated with respect to all of the nets within the LSI. The data (parameters) may be acquired from the net table 33, the node table 34, and the segment table 35 with respect to each target net. The delay time may be calculated by selecting the calculating method with respect to the data that are acquired, by referring to the limit values and the like in the limit value table 31 and the designated driver table 32.

The process of creating the tables 31 and 32 by the first table creating unit 11, and the process of creating the tables 33 through 35 by the second table creating unit 12 may be performed when starting the delay time calculating process illustrated in FIG. 5. In addition, the process of creating the tables 33 through 35 by the second table creating unit 12 may be performed when the data of the tables 33 through 35 are preferred. In other words, the second table creating unit 12 may obtain the parameters such as the fan-out number, the total wiring length, the total wiring capacitance, the total wiring resistance, the wiring type, the calculation complete flag FLG, and the like from the net list 21 and the physical information 22 when the parameters are preferred, and store the obtained parameters in the tables 33 through 35 in a manner obtainable (or retrievable) by the net delay calculating unit 13.

In FIG. 5, when the delay time calculating process starts, a step S0-1 performs an initializing process in order to set the calculation complete flag FLG to the value "0" indicating that the calculation of the delay time has not been performed with respect to the target net.

A step S0-2 obtains the physical information of the net, namely, the node number, from the net table 33, and sorts all of the nets within the LSI in an order starting from the net having the largest node number. The larger the node number of the net, the more complex the wiring, and the longer the wiring length or the larger the wiring load tends to be. Hence, in this example, the target net that is the calculation target is selected starting from the net having the large node number, in order to calculate the delay time by the detailed calculation starting from the net having the large node number with a priority over the nets having smaller node numbers. As a result, the delay time of the net preferring a predetermined calculation accuracy may be calculated within a limited time with a priority over nets not preferring the predetermined calculation accuracy. The step S0-2 may be omitted when selecting the target net regardless of the node number.

A step S1 performs the process of a step S2 and subsequent steps by performing a loop process amounting to the number of all of the nets within the LSI. The step S2 judges whether the calculation complete flag FLG is FLG=1 or 2, or FLG=0 or 3. When the calculation complete flag FLG is FLG=1 or 2, it is indicated that the delay time of the target net is already calculated by the simple calculation or the detailed calculation according to various conditions, and the process returns to the step S1 to move to the processing of the next net because the calculation of the delay time of this target net is not preferred. On the other hand, when the calculation complete flag FLG is FLG=0 or 3, the calculation of the delay time of the target net has not been performed, or the previous calculation of the target net has been switched to the simple calculation due to exceeding the time limit, and the process advances to a step S3 because the judging of the various conditions is preferred.

The step S3 judges whether an elapsed time from the start of the delay time calculating process illustrated in FIG. 5 is within a set time. For example, the set time may be set to the limit time Tx. When the set time is not set, it is assumed for the sake of convenience that the limit time Tx in the limit value table 31 illustrated in FIG. 2 is set to infinity or a sufficiently large value. When a judgement result in the step S3 is NO, a step S23 sets the calculation complete flag FLG to a value "3", and the process advances to a step S21 which will be described later in order to perform the simple calculation. On the other hand, when the judgement result in the step S3 is YES, the process advances to a step S4, and a calculation suited for the judgement using the various conditions described below is performed, with the calculation complete flag FLG being rewritten from the value "3" to a value "1" or "2".

The order of performing the steps S2 and S3 may be reversed. In this case, the step S2 is performed when the judgement result in the step S3 is YES, and the process advances to the step S4 when the step S2 judges that the calculation complete flag FLG has the value "0" or "3".

The step S4 acquires the driver name of the target net from the net table 33, and stores the acquired driver name, Dry, in the storage unit 15. A step S5 judges whether the driver name Dry is stored in the designated driver table 32. In this example, when performing the detailed calculation depending on the driver type, it is assumed for the sake of convenience that the driver name is designated by the control data 25, as information of the designated condition J1 determined by the input designation from the user, and stored in the designated driver table 32. When the driver of the target net acquired from the net table 33 has the driver name designated by the information of the designated condition J1, this driver name is stored in the designated driver table 32, and a judgement result in the step S5 becomes YES. When the judgement result in the step S5 is YES, the process advances to a step S20 and the calculation complete flag FLG is rewritten to the value "2", and the process thereafter advances to a step S22 in order to perform the detailed calculation. Accordingly, in the circuit and the like in which a driver resistance, a circuit structure, a driving capacity (or driving power), and the like greatly affect the calculation accuracy, the information of the designated condition J1 (that is, control data 25) determined by the input designation from the user may be selected by designating the detailed calculation in advance in order to maintain the calculation accuracy of the delay time.

When the judgement result in the step S5 is NO, a step S6 acquires an inductance component of the target net from the net table 33, and stores the acquired inductance component, L, in the storage unit 15. A step S7 judges whether the inductance component L of the target net has the value "0" designated by the control data 25, that is, the information of the designated condition J1 determined by the input designation from the user.

This value "0" may be stored in the limit value table 31. When the inductance component L is not "0" and a judgement result in the step S7 is NO, the process advances to the step S20 and the calculation complete flag FLG is rewritten to the value "2", and the process thereafter advances to the step S22 in order to perform the detailed calculation. This is because the inductance component L is not used as a parameter of the calculation formula for the delay time in the simple calculation, and the simple calculation does not take into consideration the effects of the inductance component L. Depending on the model used at the time when the stray capacitance is extracted, the inductance component L is not extracted in some cases, and in such cases, the detailed calculation may of course be performed by ignoring the inductance component L.

The wiring of the target net may include a logical wiring and a real wiring. Hence, when the judgement result in the step S7 is YES, a step S8 acquires the wiring type from the net table 33, and judges whether the wiring type is the logical wiring or the real wiring. In the case of the logical wiring, the resistance and the capacitance of the wiring is calculated from the wiring length that is assumed when a shortest virtual wiring is made from a cell layout position. On the other hand, the real wiring includes the resistance, the capacitance, and the inductance of the actual wiring, and the stray component of the actual wiring caused by other adjacent wirings. For this reason, the designated condition J1 determined by the input designation from the user in this example is set to basically perform the simple calculation with respect to the target net of the logical wiring. In other words, when a judgement result in the step S8 indicates the logical wiring, the process advances to a step S19 and the calculation complete flag FLG is rewritten to the value "1", and the process thereafter advances to the step S21 in order to perform the simple calculation.

On the other hand, when the judgement result in the step S8 indicates the real wiring, the process advances to a step S9. The step S9 acquires the node number of the target net from the net table 33, and stores the acquired node number, Nnet, in the storage unit 15. A step S10 judges whether the node number Nnet is less than the node number Nx of the limit value table 31. The physical information 22 of the target net includes a metal wiring parts and nodes that connect the metal wiring parts. As will be described later in conjunction with FIG. 6, the larger the node number, the more complex the shape of the nets, and the length of the nets tend to become longer. The calculation accuracy of the delay time calculated by the simple calculation may be low for the target net having the large node number, and the detailed calculation may be preferable for the node number greater than or equal to a predetermined value (for example, "5"). Hence, when a judgement result in the step S10 is NO, the process advances to the step S20 and the calculation complete flag FLG is rewritten to the value "2", and the process thereafter advances to the step S22 in order to perform the detailed calculation.

On the other hand, when the judgement result in the step S10 is YES, a step S11 acquires the fan-out number of the target net from the net table 33, and stores the acquired fan-out number, fo, in the storage unit 15. A step S12 judges whether the fan-out number fo is less than the fan-out number FOx of the limit value table 31. The fan-out number refers to the number of receivers connected to the target net. The larger the fan-out number, the more complex the circuit structure. In addition, the calculation accuracy of the delay time calculated by the simple calculation may be low for the target net having the large fan-out number, and the detailed calculation may be preferable for the fan-out number greater than or equal to a predetermined value (for example, "2"). When the fan-out number is "1", for example, the calculation error between the simple calculation and the detailed calculation may be relatively small. Hence, when a judgement result in the step S12 is NO, the process advances to the step S20 and the calculation complete flag FLG is rewritten to the value "2", and the process thereafter advances to the step S22 in order to perform the detailed calculation.

When the judgement result in the step S12 is YES, a step S13 acquires the total wiring length of the target net from the net table 33, and stores the acquired total wiring length, l, in the storage unit 15. A step S14 judges whether the total wiring length l is less than the wiring length Lx of the limit value table 31. The larger the wiring length of the target net, the larger the load resistance and the capacitance, and the more the undesirable effects on the calculation accuracy of the delay time. The detailed calculation may be preferable for the total wiring length greater than or equal to a predetermined value (for example, 10 μm). Hence, when a judgement result in the step S14 is NO, the process advances to the step S20 and the calculation complete flag FLG is rewritten to the value "2", and the process thereafter advances to the step S22 in order to perform the detailed calculation.

When the judgement result in the step S14 is YES, a step S15 acquires the total capacitance of the target net from the net table 33, and stores the acquired total capacitance, c, in the storage unit 15. A step S16 judges whether the total capacitance c is less than the total capacitance Cx of the limit value table 31. The detailed calculation may be preferable for the total wiring capacitance (or total wiring resistance) greater than or equal to a predetermined value. The total wiring capacitance (or total wiring resistance) of the target net may be set to a value that is three times that of an input pin of an inverter used as a reference, for example. Alternatively, the detailed calculation may be performed when the total wiring capacitance (or total wiring resistance) of the target net is 5 fF (or 5Ω) or greater. A case in which the capacitance of the target net is large may be affected by the complexity of the wiring shape, including a case in which the wiring is long, a case in which the fan-out number is large, and the like. For this reason, with respect to the target net satisfying the condition of the step S12 described above, the step S14 (or step S16) further narrows the condition.

When a judgement result in the step S16 is NO, the process advances to the step S20 and the calculation complete flag FLG is rewritten to the value "2", and the process thereafter advances to the step S22 in order to perform the detailed calculation. On the other hand, when the judgement result in the step S16 is YES, a step S17 acquires the total wiring resistance of the target net from the net table 33, and stores the acquired total wiring resistance, r, in the storage unit 15. A step S18 judges whether the total wiring resistance r is less than the total resistance Rx (predetermined value) of the limit value table 31. When a judgement result in the step S18 is NO, the process advances to the step S20 and the calculation complete flag FLG is rewritten to the value "2", and the process thereafter advances to the step S22 in order to perform the detailed calculation. On the other hand, when the judgement result in the step S18 is YES, the process advances to the step S19 and the calculation complete flag FLG is rewritten to the value "1", and the process thereafter advances to the step S21 in order to perform the simple calculation.

The step S21 acquires the preferred parameters from the tables 33 through 35 to calculate the delay time of the net by the simple calculation, and stores the calculated delay time in the storage unit 15. The process returns to the step S1 after the step S21. In addition, the step S22 acquires the preferred parameters from the tables 33 through 35 to calculate the delay time of the net by the detailed calculation, and stores the calculated delay time in the storage unit 15. The process returns to the step S1 after the step S22, in order to perform a process similar to that described above, with respect to the next target net within the circuit.

The calculation error between the simple calculation and the detailed calculation may differ depending on the calculation formulas used by the simple calculation and the detailed calculation. For this reason, the node number, the fan-out number, the wiring length, the total wiring capacity, and the total wiring resistance may be designated from outside the delay time calculating apparatus.

The delay time of each net within the LSI may be calculated according to the calculating method (simple calculation or detailed calculation) selected by the process illustrated in FIG. 5. In addition, a value that identifies the calculating method used to calculate the delay time may be set in the calculation complete flag FLG of each net.

By selecting the net for which a satisfactory calculation accuracy may be maintained even by use of the simple calculation, and suitably using the simple calculation or the detailed calculation depending on the net, the calculation time to calculate the delay time (or net delay) of the nets within the entire LSI may be reduced.

As described above, the calculation time of the wiring delay may be reduced by suitably using the simple calculation or the detailed calculation, however, depending on an implementation state of the wirings, the delay time calculating process is not completed within a predetermined time. Hence, the steps S3 and S23 illustrated in FIG. 5 provide the set time to switch from the detailed calculation to the simple calculation when preferred to calculate the delay time, in order to complete the delay time calculating process with respect to all of the nets within the LSI within the predetermined time. Accordingly, the delay time of the net preferring a predetermined calculation accuracy may be calculated within a limited time with a priority over the delay time of other nets.

When the calculation complete flag FLG of the target net has the value "1" or "2", it is indicated that the delay time of this target net is already calculated by the simple calculation or the detailed calculation depending on the various conditions. On the other hand, when the calculation complete flag FLG of the target net has the value "0" or "3", it is indicated that the calculation of the delay time of this target net has not been performed or that the previous calculation of this target net has been switched to the simple calculation due to exceeding the time limit. Hence, when re-executing the calculation of the delay time, the detailed calculation may be performed with respect to the net for which the delay time has already been calculated by the simple calculation, by confirming that the calculation complete flag FLG of the net has the value "3".

Next, a description will be given of the nodes in the nets of the LSI. As described above, the node refers to the input and/or output pin, the vias, and the like. Moreover, when a single wiring is taken into consideration, each of the resistance and the capacitance per unit has the same or uniform value. However, when another wiring is adjacent to the single wiring, the capacitance of the single wiring changes due to the effects of this other adjacent wiring. In other words, the capacitance of the single wiring partially differ. Thus, the node is generated at the part where the capacitance changes.

When analyzing the net, the calculation accuracy may be improved by regarding the circuit as being a distributed constant circuit rather than a concentrated constant circuit. For this reason, in the disclosed delay time calculating method, when the length of one segment exceeds a predetermined length of 10 μm, for example, this one segment is segmented (or divided) by the nodes into units of 10 μm so that the length of one segment is 10 μm at the maximum. In this case, the node is generated in the same manner as that described above. In other words, one relatively long wiring is segmented into a plurality of wirings by inserting virtual vias. The predetermined length (10 μm in this example) may be set depending on the technology condition and the like, and may be variable.

Figure 6:
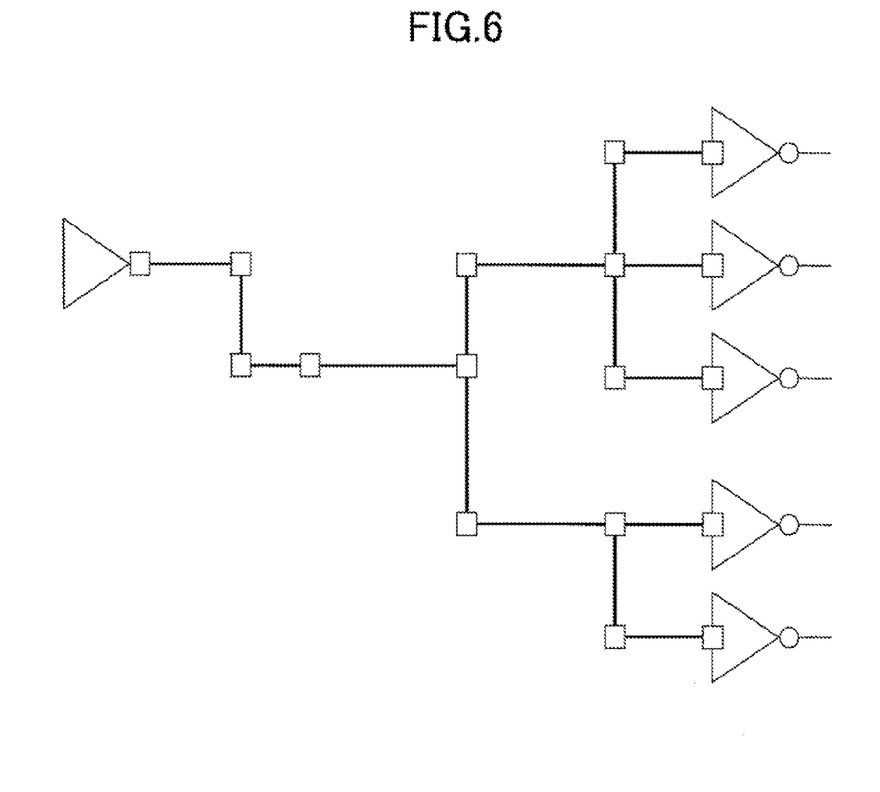
FIG. 6 is a diagram for explaining an example of segments.
Figure 7:
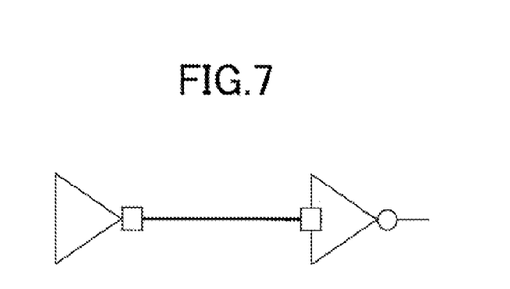
FIG. 7 is a diagram for explaining another example of the segments.

FIGS. 6 and 7 are diagrams for explaining examples of the segments connecting the nodes, together with the nodes generated by the method described above. In FIGS. 6 and 7, a square symbol indicates the node, and a straight solid line indicates the segment such as the metal wiring and the like. In FIG. 6, the node number is "17", the driver number is "1", and the receiver number is "5". On the other hand, in FIG. 7, the node number is "2", the driver number is "1", and the receiver number is "1".

In the case of a C model, for example, the net is regarded as being a concentrated capacitance. In the net having a plurality of receivers as illustrated in FIG. 6, the delay between each driver-receiver pair is different, however, the C model may not represent the different delays of the driver-receiver pairs. Hence, even when the length is the same, the complexity of the net increases when the node number and/or the receiver number (or fan-out number) increases, and may adversely affect the calculation accuracy.

For example, according to the 45 nm technology, when a simulation is performed by the SPICE (Simulation Program with Integrated Circuit Emphasis) or the like for a case in which the node number is "2", the fan-out number is "1", and the wiring length is 10 μm, the minimum unit of the net delay becomes less than 1 ps. When the target accuracy of the delay time is less than or equal to 1 ps, this target accuracy may be sufficiently satisfied under the above described condition in which the minimum unit of the net delay is less than 1 ps.

Accordingly, the default values of the conditions of the delay time calculating process described above in conjunction with FIG. 5 Nx=2, FOx=1, and Lx=10 μm for the simple or simplest net shape illustrated in FIG. 7, and the total capacitance Cx and the total resistance Rx may be calculated because an average resistance R per unit length and an average capacitance C per unit length are known. In addition, when the simulation is performed by the SPICE or the like with respect to the target technology, the total capacitance Cx and the total resistance Rx of the wiring may be adjusted to make the net delay less than 1 ps, and the wiring length Lx for this case may be obtained by a back calculation in order to obtain Nx=Lx/10 μm.

Examples of the delay time calculating method include the Elmore, the second-order Elmore approximation, the AWE, the PRIMA, and the like. The Elmore uses a simple delay model (or Elmore delay model) of a RC circuit in order to represent the delay time by a simple approximation, and may be categorized as a simple calculating method. The second-order Elmore approximation solves a second-order approximation with respect to the Elmore, and may be categorized as a simple calculating method. The AWE approximates a response waveform of a circuit network and obtains a first-order solution equivalent to the Elmore delay model and a second-order solution equivalent to the solution of the second-order approximation of the second-order Elmore approximation, and may be categorized as a detailed calculating method. In the case of the AWE, the calculation accuracy is high in that the higher the order of the solution the closer the solution is to the actual waveform. However, in some cases, a solution is not obtainable by the AWE, and the calculation cost of the AWE may be relatively high. On the other hand, the PRIMA solves the determinant representing the circuit formula (or equation) by reducing elements of the determinant, and may be categorized as a detailed calculation method.

The accuracy of the delay time calculated by the second-order Elmore approximation is sufficiently high in the case of a relatively simple circuit having a relatively short wiring and only one receiver, for example. Hence, in the example described above, the second-order Elmore approximation having the relatively low calculation cost may be used for the simple calculation, and the PRIMA may be used for the detailed calculation.

Figure 8:
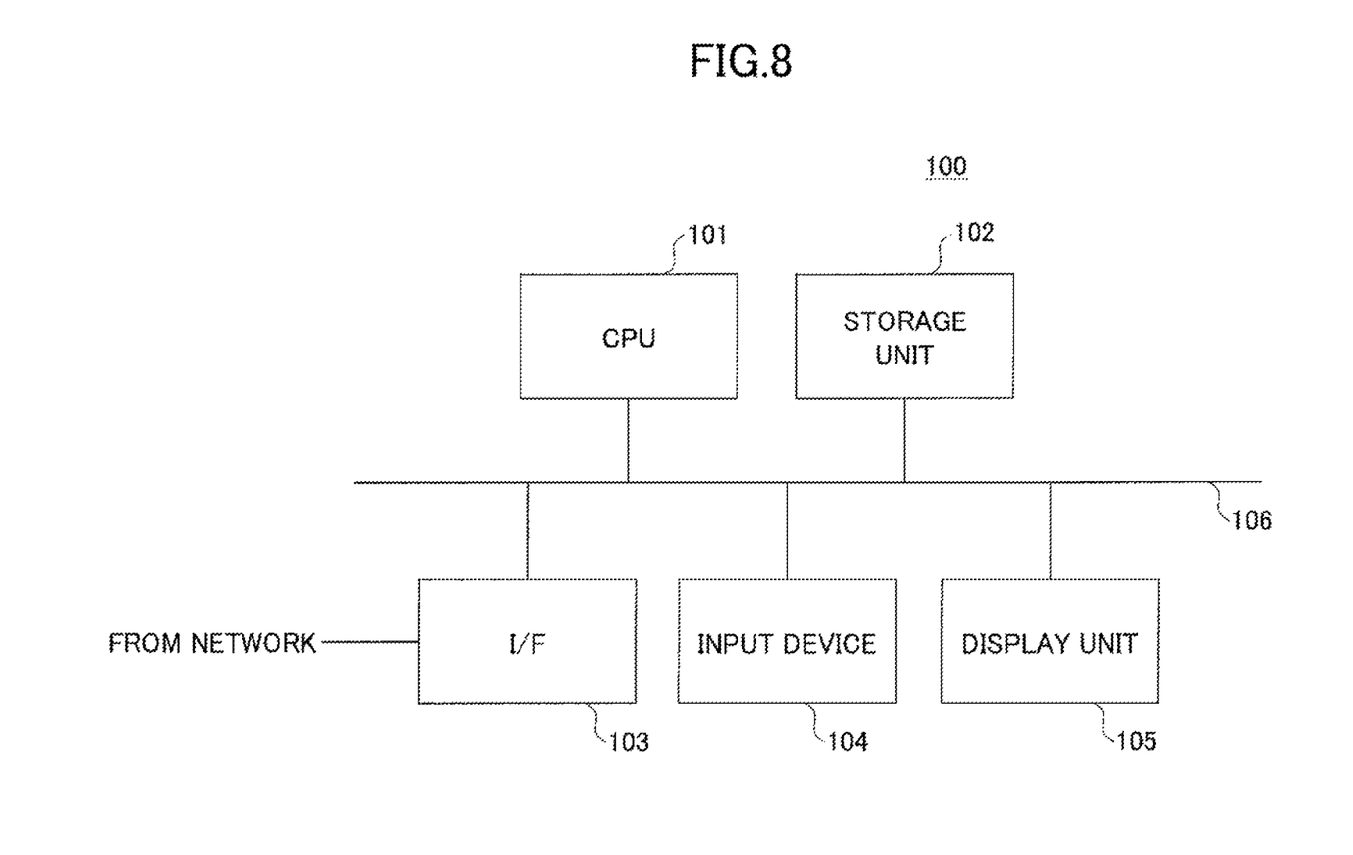
FIG. 8 is a block diagram illustrating an example of a computer system.

FIG. 8 is a block diagram illustrating an example of a computer system. A computer system 100 illustrated in FIG. 8 includes a CPU (Central Processing Unit) 101, a storage unit 102, an interface (I/F) 103, an input device 104, and a display unit 105 that are connected via a bus 106. The connection of the CPU 101, the storage unit 102, the I/F 103, the input device 104, and the display unit 105 is not limited to the connection using the bus 106.

The CPU 101 may control the entire computer system 100 by executing one or more programs stored in the storage unit 102. The storage unit 102 stores the one or more programs described above and various data, and may function as a temporary memory to store intermediate results of operations, result of operations, and the like executed by the CPU 101. The storage unit 102 may be formed by a non-transitory computer-readable storage medium, such as a semiconductor memory device, a magnetic recording medium an optical recording medium, a magneto-optical recording medium, and the like. The storage unit 102 may also function as the storage unit 15 illustrated in FIG. 1, and may store the delay DB 24. The I/F 103 may receive, via a network (not illustrated), data and programs to be stored in the storage unit 102, from an external apparatus (not illustrated) such as an external storage unit and the like. The I/F 103 may also send data, via the network, to the external apparatus such as the external storage unit and the like, when preferred. The input device 104 may be formed by a keyboard and the like. The display unit 105 may be formed by a display and the like. The input device 104 and the display unit 105 may be formed by an input and output device, such as a touch-screen panel, integrally having the functions of both the input device 104 and the display unit 105.

The CPU 101 may execute the program stored in the storage unit 102, and cause the computer system 100 to function at least as the delay time calculating apparatus 1. The elapsed time from the start of the delay time calculating process illustrated in FIG. 5 may be measured by an internal timer of the CPU 101, for example. The program may cause the CPU 101 to execute procedures of a design process of a design target (or analyzing process of an analyzing target) such as a LSI and the like. The program may be stored in a suitable non-transitory computer-readable storage medium, including the storage unit 102. In addition, the program may cause the CPU 101 to realize the functions of each of the parts 11 through 14 illustrated in FIG. 1 or, cause the CPU 101 to execute at least the delay time calculating process illustrated in FIG. 5. In other words, the program that causes the CPU 101 to execute the delay time calculating process illustrated in FIG. 5 may be formed as a plug-in with respect to the program that causes the CPU 101 to execute the procedures of the design process (or analyzing process).

The disclosed delay time calculating apparatus and method and computer-readable storage medium do not extract the capacitance as in the case of the Japanese Laid-Open Patent Publication No. 7-182380, and instead selects the calculating method that may optimize the calculation cost and the calculation accuracy of the net with respect to the extracted resistance-capacitance component RC or the inductance component L. Hence, the optimum calculating method may be selected using the same model, regardless of whether the model is for extracting the wiring capacitance or the wiring resistance. In other words, the high-precision calculation of the delay time of the net, including the inductance, may be performed without being dependent upon the model. In addition, the selection of the calculating method takes into consideration the complexity of the net shape, such as the node number, the fan-out number, and the like, in addition to taking into consideration the wiring length. As an example, when one of two models is selected depending solely on the wiring length according to the Japanese Laid-Open Patent Publication No. 7-182380, a different model may be selected depending on a difference of 0.01 μm between the wiring lengths of the models, and as a result, the delay time that is calculated by the calculation formula may greatly differ depending on the model that is selected. However, the disclosed delay time calculating apparatus and method and computer-readable storage medium may efficiently perform the high-precision calculation of the delay time by avoiding such a great difference from being generated in the delay time calculated depending on the model that is selected according to the Japanese Laid-Open Patent Publication No. 7-182380, for example.

In the recent LSI having the increased design scale, the number of gates or the number of wiring nets may exceed 10,000,000. For this reason, when the high-precision calculating method is used with respect to all of the nets of the LSI, the calculation time to calculate the delay time becomes extremely long an impractical. However, according to the disclosed delay time calculating apparatus and method and computer-readable storage medium, the delay time may be calculated with respect to all of the nets of the LSI within a practical calculation time without considerably reducing the calculation accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A delay time calculating apparatus for calculating a delay time of nets within a circuit included in design data, the delay time calculating apparatus comprising:
   a processing unit configured to perform a process including
      first selecting a first delay calculating procedure to calculate the delay time of a net when the net satisfies a first condition that is determined from logical information of the circuit;
      when the first delay calculating procedure is not selected by the first selecting, second selecting the first delay calculating procedure to calculate the delay time of the net when the net satisfies a second condition that is determined from physical information of the circuit, and selecting a second delay calculating procedure to calculate the delay time of the net when the net does not satisfy the second condition; and
      calculating the delay time of the net by one of the first and second delay calculating procedures selected by one of the first and second selecting,
   wherein the first delay calculating procedure has a calculation accuracy higher than that of the second delay calculating procedure.

2. The delay time calculating apparatus as claimed in claim 1, wherein the second condition has a longer condition judging time than that of the first condition.

3. The delay time calculating apparatus as claimed in claim 1, wherein the first selecting selects the first delay calculating procedure when one of a number of nodes of the net and a number of fan-outs of the net is greater than or equal to a predetermined number.

4. The delay time calculating apparatus as claimed in claim 3, wherein the second selecting includes
   when one of a total wiring length of the net, a total capacitance of the net, and a total resistance of the net is greater than or equal to a predetermined value, selecting the first delay calculating procedure; and
   when the total resistance of the net is less than the predetermined value, selecting the second delay calculating procedure.

5. The delay time calculating apparatus as claimed in claim 1, further comprising:
   a storage unit,
   wherein the process further includes
      storing, in the storage unit, a flag identifying the delay calculating procedure used by the calculating to calculate the delay time, together with the delay time calculated by the calculating.

6. The delay time calculating apparatus as claimed in claim 1, wherein the process further includes
   prior to the first selecting, sorting the nets that are calculation targets in an order starting from the net having a largest number of nodes.

7. A delay time calculating apparatus for calculating a delay time of nets within a circuit included in design data, the delay time calculating apparatus, comprising:
   an input device; and
   a processing unit configured to perform a process including
      first selecting a first delay calculating procedure to calculate the delay time of a net when the net satisfies a first condition;
      when the first delay calculating procedure is not selected by the first selecting, second selecting one of the first delay calculating procedure and a second delay calculating procedure to calculate the delay time of the net, depending on whether the net satisfies a second condition; and calculating the delay time of the net by one of the first and second delay calculating procedures selected by one of the first and second selecting; and prior to the first selecting, third selecting the first delay calculating procedure depending on a designated condition determined from an input designation from the input device, wherein the first selecting selects the first delay calculating procedure depending on the first condition determined from logical information of the circuit, when the third selecting does not select the first delay calculating procedure, and wherein the second selecting selects one of the first and second delay calculating procedures depending on the second condition determined from physical information of the circuit, when the third and first selecting do not select the first delay calculating procedure.

8. The delay time calculating apparatus as claimed in claim 7, wherein the process further includes prior to the third selecting, fourth selecting the first delay calculating procedure when a calculation time of the delay time of the net exceeds a predetermined time.

9. The delay time calculating apparatus as claimed in claim 7, wherein the third selecting includes when a driver of the net is a designated driver type, or when an inductance component of the net is non-zero, selecting the first delay calculating procedure; and when a wiring type of the net is a logical wiring, selecting the second delay calculating procedure.

10. A delay time calculating method for calculating, by a computer, a delay time of nets within a circuit included in design data, the process comprising:

first selecting, by the computer, a first delay calculating procedure to calculate the delay time of a net when the net satisfies a first condition that is determined from logical information of the circuit;

when the first delay calculating procedure is not selected by the first selecting, second selecting, by the computer, the first delay calculating procedure to calculate the delay time of the net when the net satisfies a second condition that is determined from physical information of the circuit, and selecting a second delay calculating procedure to calculate the delay time of the net when the net does not satisfy the second condition; and calculating, by the computer, the delay time of the net by one of the first and second delay calculating procedures selected by one of the first and second selecting, wherein the first delay calculating procedure has a calculation accuracy higher than that of the second delay calculating procedure.

11. The delay time calculating method as claimed in claim 10, wherein the second condition has a longer condition judging time than that of the first condition.

12. A non-transitory computer-readable storage medium having stored therein a program for causing a computer to execute a process to calculate a delay time of nets within a circuit included in design data, the process comprising:

first selecting a first delay calculating procedure to calculate the delay time of a net when the net satisfies a first condition that is determined from logical information of the circuit;

when the first delay calculating procedure is not selected by the first selecting, second selecting the first delay calculating procedure to calculate the delay time of the net when the net satisfies a second condition that is determined from physical information of the circuit, and selecting a second delay calculating procedure to calculate the delay time of the net when the net does not satisfy the second condition; and calculating the delay time of the net by one of the first and second delay calculating procedures selected by one of the first and second selecting, wherein the first delay calculating procedure has a calculation accuracy higher than that of the second delay calculating procedure.

13. The non-transitory computer-readable storage medium as claimed in claim 12, wherein the second condition has a longer condition judging time than that of the first condition.

14. The non-transitory computer-readable storage medium as claimed in claim 12, wherein the first selecting selects the first delay calculating procedure when one of a number of nodes of the net and a number of fan-outs of the net is greater than or equal to a predetermined number.

15. The non-transitory computer-readable storage medium as claimed in claim 14, wherein the second selecting includes when one of a total wiring length of the net, a total capacitance of the net, and a total resistance of the net is greater than or equal to a predetermined value, selecting the first delay calculating procedure; and when the total resistance of the net is less than the predetermined value, selecting the second delay calculating procedure.

16. The non-transitory computer-readable storage medium as claimed in claim 12, wherein the process further comprises:

storing, in a storage unit, a flag identifying the delay calculating procedure used by the calculating to calculate the delay time, together with the delay time calculated by the calculating.

17. The non-transitory computer-readable storage medium as claimed in claim 12, wherein the process further comprises:

prior to the first selecting, sorting the nets that are calculation targets in an order starting from the net having a largest number of nodes.

18. The A non-transitory computer-readable storage medium having stored therein a program for causing a computer to execute a process to calculate a delay time of nets within a circuit included in design data, the process comprising:

first selecting a first delay calculating procedure to calculate the delay time of a net when the net satisfies a first condition;

when the first delay calculating procedure is not selected by the first selecting, second selecting one of the first delay calculating procedure and a second delay calculating procedure to calculate the delay time of the net, depending on whether the net satisfies a second condition; and calculating the delay time of the net by one of the first and second delay calculating procedures selected by one of the first and second selecting; and prior to the first selecting, third selecting the first delay calculating procedure depending on a designated condition determined from an input designation from an input device, wherein the first selecting selects the first delay calculating procedure depending on the first condition determined from logical information of the circuit, when the third selecting does not select the first delay calculating procedure, and wherein the second selecting selects one of the first and second delay calculating procedures depending on the second condition determined from physical information of the circuit, when the third and first selecting do not select the first delay calculating procedure.

19. The non-transitory computer-readable storage medium as claimed in claim 18, wherein the process further comprises:
prior to the third selecting, fourth selecting the first delay calculating procedure when a calculation time of the delay time of the net exceeds a predetermined time.

20. The non-transitory computer-readable storage medium as claimed in claim 18, wherein the third selecting includes
when a driver of the net is a designated driver type, or when an inductance component of the net is non-zero, selecting the first delay calculating procedure; and
when a wiring type of the net is a logical wiring, selecting the second delay calculating procedure.

21. A delay time calculating method for calculating, by a computer, a delay time of nets within a circuit included in design data, the process comprising:
first selecting, by the computer, a first delay calculating procedure to calculate the delay time of a net when the net satisfies a first condition;
when the first delay calculating procedure is not selected by the first selecting, second selecting, by the computer, one of the first delay calculating procedure and a second delay calculating procedure to calculate the delay time of the net, depending on whether the net satisfies a second condition;
calculating, by the computer, the delay time of the net by one of the first and second delay calculating procedures selected by one of the first and second selecting; and
prior to the first selecting, third selecting, by the computer, the first delay calculating procedure depending on a designated condition determined from an input designation from an input device,
wherein the first selecting selects the first delay calculating procedure depending on the first condition determined from logical information of the circuit, when the third selecting does not select the first delay calculating procedure, and
wherein the second selecting selects one of the first and second delay calculating procedures depending on the second condition determined from physical information of the circuit, when the third and first selecting do not select the first delay calculating procedure.

* * * * *